E. ATKINSON.
AIRPLANE LAUNCHING MEANS.
APPLICATION FILED APR. 30, 1919.

1,317,414.                                Patented Sept. 30, 1919.

Inventor
Earl Atkinson
By his Attorney

UNITED STATES PATENT OFFICE.

EARL ATKINSON, OF MORSEMERE, NEW JERSEY.

AIRPLANE-LAUNCHING MEANS.

1,317,414.

Specification of Letters Patent.   Patented Sept. 30, 1919.

Application filed April 30, 1919.   Serial No. 293,698.

*To all whom it may concern:*

Be it known that I, EARL ATKINSON, a citizen of the United States, residing at Morsemere, in the county of Bergen and State of New Jersey, have invented a new and useful Improvement in Airplane-Launching Means, of which the following is a specification.

This invention relates to airplanes, and my improvement is directed to means for facilitating the taking off or starting an airplane from the ground without requiring it to first run along the surface.

The stretch of level ground which now has to be traversed for the purpose of enabling an airplane to acquire flight sustaining speed, presents a serious detriment to the progress of aviation, because suitable starting places are not always available in the localities where needed; and the necessity is apparent to me for some practical method whereby the inertia of the airplane may be overcome, through the application of a starting impulse, at a time when the propeller thrust has attained an efficiency capable of permitting the aerofoils to meet supporting pressures.

Therefore my invention is directed to the employment of impelling means, such as a compressed air charge, applied reactively to project the airplane forwardly with a catapulting action. Also in coördinated relation with the starting impulse given the airplane I provide leverage means actuated by the propeller thrust while approaching its peak of efficiency, to lift the airplane at its landing gear clear from the supporting surface, just prior to the application of the forwardly impelling impulse.

Therefore I am enabled to coördinate the factors of propeller thrust, a reactive forward impulse and a mechanical raising of the airplane at its forward portion to avoid surface traction, so that the airplane is given a free standing start, and is projected into the air under instantly created favorable sustentation conditions.

Although I am not limited to any particular apparatus for the application of the impulsive compressed air charge to initially project an airplane into the air while the propeller is exerting a flight sustaining thrust, I may accomplish this object by providing a reservoir, suitably charged with compressed air, (for which purpose a compressor may have been operated by the airplane motor) and by connecting said reservoir with a hollow, telescopic member, adapted to engage the airplane and extend therefrom in a forward angle, contracted, to the supporting surface. Means which normally shut off communication between the compressed air reservoir and the hollow member or leg are adapted to open automatically as the airplane, under the increasing thrust of the propeller, is lifted to clear its landing gear from the surface, the opening up of this communication occurring when the hollow leg, whose foot portion forms a fulcrum with the earth, has, in acting as a lever to lift the airplane, changed its angle from a forwardly downward direction to a rearwardly downward direction, so that the pressure rush of air into the hollow leg has the effect of suddenly extending its telescoped section, thereby reactively giving a swift forward kick to the airplane, to then launch it into the air.

Other features and advantages of my said invention will hereinafter appear.

Figure 1:
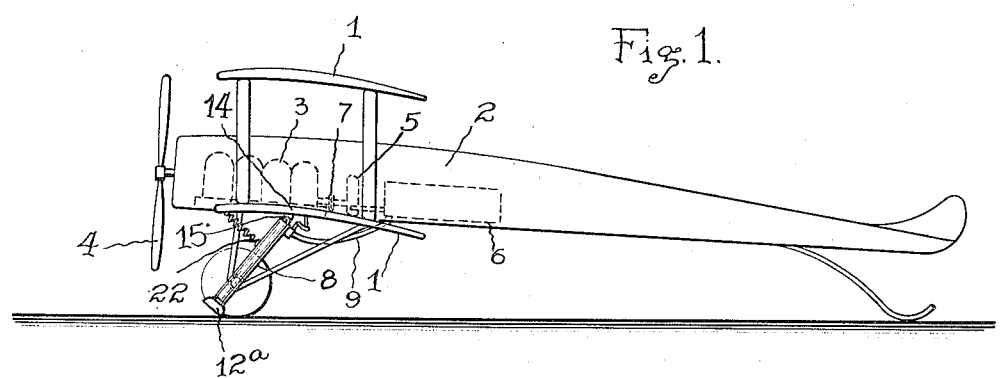
Figure 1 is a side elevation of an airplane equipped with my improved launching means.
Figure 2:
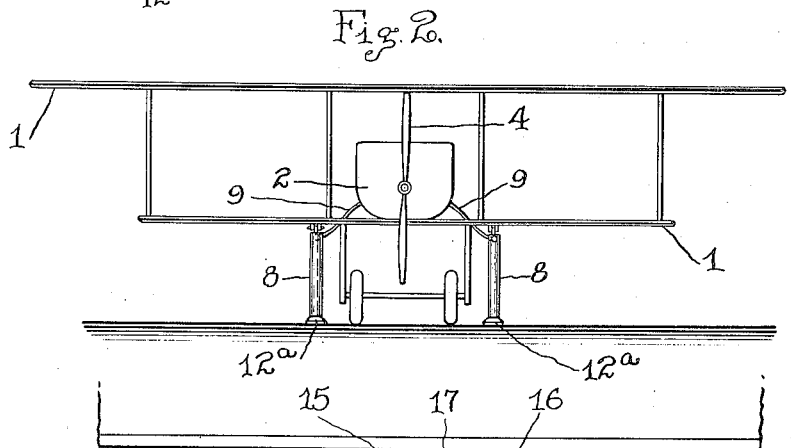
Fig. 2 is a front view thereof.
Figure 3:
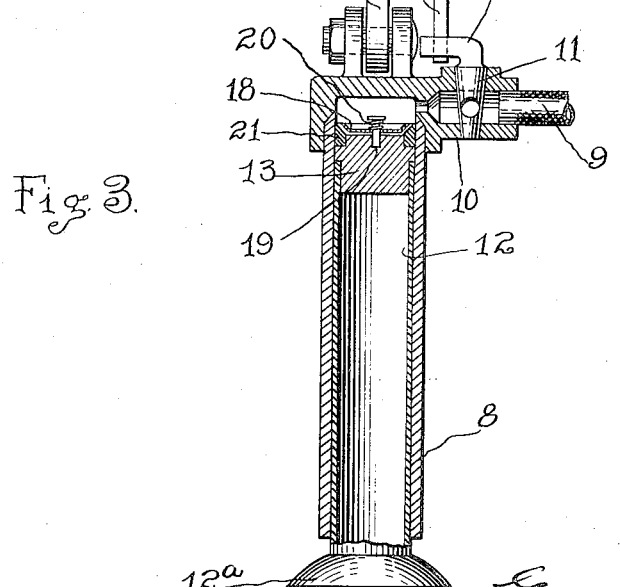
Fig. 3 is an enlarged detail view, in section, of the projecting device.

In the example of my improved launching means for airplanes illustrated herein, let 1 indicate the aerofoils of a supporting unit, here shown as a bi-plane, 2 the fuselage, 3 the motor, and 4 the propeller.

An air compressor, as 5, is indicated as supported in proximity to the motor, to be operated thereby, for the purpose of charging a reservoir 6. Suitable connecting and disconnecting means between the motor shaft and the compressor, as at 7, may be employed, to enable the motor to run free and develop the propeller speed when the reservoir 6 has been properly charged. The reservoir 6 is connected with a hollow member 8 as by a flexible tube 9, that engages a valve casing 10, in which is fitted valve 11. The member 8 serves as a sheath for an inner, slidable member 12, having a head 13 to receive pressure which operates to extend the members 8, 12. Said member 12 has a foot portion 12ª to engage the earth, and the telescopic leg, with its members 8, 12 collapsed, is of sufficient length to lie at a forwardly downward inclination between the airplane and the earth.

The member 8 is in engagement with the airplane as at a point 14 at the under surface of an aerofoil, where a fitting 15 is provided to effect a hinge joint therewith. I have shown two of these telescopic legs, located a suitable distance apart, to properly balance the airplane when its landing gear is being lifted thereby from the earth. The description of one of said telescopic legs applies to any larger number thereof that may be employed.

The valve 11 has an arm 16; and a detent 17, which may extend from near the fitting 15, lies in the path of movement of said arm 16, so that a swinging movement of the airplane relatively to a telescopic leg, will cause the detent 17 to strike the arm 16 and thus turn and open valve 11.

It will be evident that when the propeller is revolving at sufficient speed to overcome the weight of the airplane, the first effect thereof will be to lift the forward portion of the airplane, using the collapsed legs as poles or levers, upon which the airplane mounts while said legs move through a rising arc. The degree of propeller thrust which has served to thus mount the forward portion of the airplane may not be sufficient to take the airplane into the air, and the telescopic legs, having carried the airplane upwardly through their rising arc, until they are upright, will, under the weight of the airplane, move forwardly in a downward arc. It is while the legs are describing this downward arc, with their feet planted rearwardly against the earth, that I purpose applying a power impulse, through the medium of said legs, to assist in launching the airplane into the air. Therefore, at a predetermined point in the downward arc being described by the legs, the valve 11 is caused to be opened as by the means described, thus permitting a rush of compressed air from reservoir 6 to enter member 8, causing said member 8 to become suddenly extended from member 12, and bodily projecting the airplane in a forward direction. Obviously, since the propeller thrust has sufficed to lift the airplane from the earth upon the collapsed legs, the forward power stroke of said legs in shooting out under the pressure impulse, will impart such initial momentum to the airplane that the latter will take the air at flight sustaining speed, which the propeller thrust can thereafter be relied upon to maintain.

The head 13 of member 12, which acts as a piston or plunger, is surmounted by a cup shaped disk 18, a stud or screw 19 connecting said disk and head, and an intermediary spring 20 normally distending them, so that a flexible packing ring, 21, interposed between the head and disk, may be pressed against member 8 when pressure is applied against the head 13, to thus prevent leakage during the power or out stroke, and so that said packing will be relaxed to permit a free return stroke when collapsing the members 8, 12.

The collapsible leg, when out of service, may be held forwardly extended, out of engagement with the ground, as by a spring 22.

In the drawing I have indicated the landing gear as provided with wheels, but it will be apparent that skids may be used instead, because the airplane is not required to roll over the surface in starting. In fact if skids are used instead of wheels the friction thereof with the surface after landing will operate as a brake to limit the distance traveled by the airplane upon the surface before coming to a halt.

Also if skids be applied to a seaplane this form of aircraft may equally well take off from the land and alight thereon.

It is not necessary in all cases that the telescopic legs and the compressor apparatus be carried by the airplane as these may conceivably comprise a ground launching plant and be left behind when the airplane is launched thereby into the air.

Variations may be resorted to within the spirit and scope of my said invention and parts thereof used without others.

I claim:

1. In an airplane having a motor and a propeller driven thereby, a compressed air supply, means operable through the propeller power to raise the airplane from its supporting surface, and automatically operable means, adapted to function while the airplane is so raised, for applying the compressed air supply to the airplane in the form of a launching impulse.

2. In an airplane having a motor and a propeller driven thereby, a compressed air supply, leverage means operable through the propeller power to raise the airplane from its supporting surface, and automatically operable means, adapted to function while the airplane is so raised, for applying the compressed air supply to the airplane in the form of a launching impulse.

3. In an airplane having a motor and a propeller driven thereby, a compressed air supply, leverage means operable through the propeller power to raise the airplane from its supporting surface, and release means operable by the movement of the airplane above the surface, to communicate the compressed air supply to the airplane in the form of a launching impulse.

4. The combination, with an airplane, of a pivotal member extended in a forwardly downward direction between the airplane and its supporting surface, whereby the initial, inherent effort of the airplane causes it to raise from the supporting surface as said member, using the supporting surface for a fulcrum, moves through a vertical arc, and automatically controlled means for imparting a launching impulse to said airplane while moving downward beyond the arc center.

5. In an airplane having a motor and a propeller driven thereby, in combination, a compressed air supply, leverage means operable through the propeller power to raise the airplane from its supporting surface, means for applying the compressed air supply to the airplane in the form of a launching impulse, and release means for the compressed air supply, controllable by the airplane in the movement thereof that is induced by the leverage raising means, to time the application to said airplane of the compressed air supply.

6. In an airplane having a motor and a propeller driven thereby, the combination of a compressed air supply, extensible leverage means operable through the propeller power to raise the airplane from its supporting surface, and automatically controlled means for directing the application of said compressed air supply axially of said leverage means in the form of a launching impulse.

7. In an airplane having a motor and a propeller driven thereby, the combination of an air compressor driven by said motor, storage means for compressed air in communication with said compressor, extensible leverage means operable through the propeller power to raise the airplane from its supporting surface, and automatically operable means, adapted to function while the airplane is so raised, for directing the application of said compressed air supply axially of said leverage means in the form of a launching impulse.

8. The combination, with an airplane, of a compressed air supply, leverage means operable by the propulsive power of the airplane to raise the latter from its supporting surface, and automatically controlled means whereby the energy of said supply is exerted to impart a launching impulse to said airplane while so raised.

9. The combination, with an airplane, having a motor and a propeller driven thereby, of a compressed air supply, a hollow, extensible, leverage member located intermediate the airplane and its supporting surface, said leverage member operable through the propeller power to lift the airplane, and means operable by the gravity return movement of the lifted airplane to release energy into said hollow member for the purpose of imparting a launching impulse to the airplane.

In testimony whereof, I have signed my name to this specification in the presence of two subscribing witnesses, this 29th day of April, 1919.

EARL ATKINSON.

Witnesses:
J. W. BARKER,
GUTH MIKOLA.